Nov. 15, 1966                W. G. BOSTON                 3,285,338
                        METHOD FOR OIL RECOVERY
                          Filed Aug. 23, 1963

WILLIAM G. BOSTON INVENTOR.

BY Emil J. Bednar
ATTORNEY

United States Patent Office 3,285,338
Patented Nov. 15, 1966

3,285,338
METHOD FOR OIL RECOVERY
William G. Boston, Dallas, Tex., assignor to Mobil Oil Corporation, a corporation of New York
Filed Aug. 23, 1963, Ser. No. 304,174
18 Claims. (Cl. 166—9)

This invention relates to the recovery of oil from a subterranean reservoir by utilizing an injected driving fluid to displace the oil to a production well. More particularly, it relates to a method for improving the efficiency of such oil production in a reservoir having a high permeability zone.

The recovery of oil by injecting a driving fluid into a reservoir from a first well to displace the oil to a second well from which the oil can be recovered is well known. Such methods to produce oil are well known and are exemplified by the various secondary recovery procedures. The efficiency of these methods depends upon several factors which include the amount of driving fluid that must be injected into a reservoir to produce the recoverable oil. In a particular aspect, the efficiency of such methods is greatly reduced where a thief strata or high permeability zone is present in the reservoir. Obviously, the oil will be displaced through such zone at a higher rate than through the remainder of the reservoir. Eventually, the driving fluid in such zone breaks through into the oil producing well. Thereafter, the production of oil by further injection of driving fluid is at a decreasing efficiency. Also, there is a possibility that the driving fluid will be sufficiently channeled through the high permeability zone to bypass portions of the reservoir and thereby leave large amounts of oil unproduced.

When the driving fluid breaks through at the high permeability zone in the reservoir, the composition of the breakthrough fluids entering the producing well through such zone is different from the fluids entering such well through the remainder of the reservoir. Further, the area of the driving fluid breakthrough is usually relatively small compared to the area of the remainder of the reservoir about the producing well which yet produces oil. In accordance with this invention, the fluid flow through such small area of driving fluid breakthrough may be effectively reduced to an acceptable amount by introducing a relatively small amount of a formation-plugging material into this area. The plugging material usually need extend only a small radial distance from the producing well to be effective.

The present invention utilizes these inherent characteristics resulting from a high permeability zone being present in an oil reservoir in a method to remedy the undesired effects of driving fluid breakthrough. As a result of such method, there is an increase in the future oil producing efficiency of the injected driving fluid. This is the primary object of the method of this invention. This and other objects of the present invention will be more apparent when read in conjunction with the following description, the appended claims, and the attached drawings wherein:

The objects of this invention are achieved, in the production of oil from a reservoir having a high permeability zone by injecting a driving fluid into a first well to displace oil toward a second well from which it can be produced, by a method comprising the several following steps. The driving fluid may be conventional and contains a material other than a hydrocarbon and which material is not reactive with the oil in the reservoir, and of course, the driving fluid. Usually, only the initial part of the driving fluid need contain such material. The oil is produced from the second well until the driving fluid containing the described material breaks through into the second well at the high permeability zone in the reservoir. Thereafter, a solution of a substance convertible to a formation-plugging material upon reaction with the described material in the driving fluid, but not the oil in the reservoir, is introduced into the reservoir from the second well. Lastly, oil is produced from the second well. The oil, as it is produced from the reservoir into the second well at other than the high permeability zone, sweeps out the substance from the reservoir into such well. Contemporaneously, the driving fluid containing the described material sweeps through the high permeability zone to produce therein a flow-restricting plugging material. If desired, a slug of a buffer fluid inert with respect to the oil, the driving fluid contining the described material, and the substance, may be introduced into the reservoir from the second well immediately prior to the step of introducing into the reservoir the solution of the substance. This additional step can be used to great advantage in certain circumstances, as will be apparent from the following description.

Figure 1:
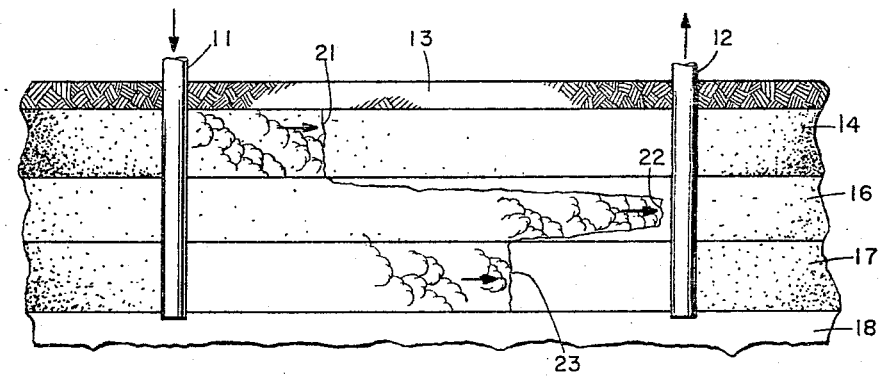
FIGURE 1 shows in section a reservoir in which an injected driving fluid in a high permeability zone is at breakthrough into an oil producing well.
Figure 2:
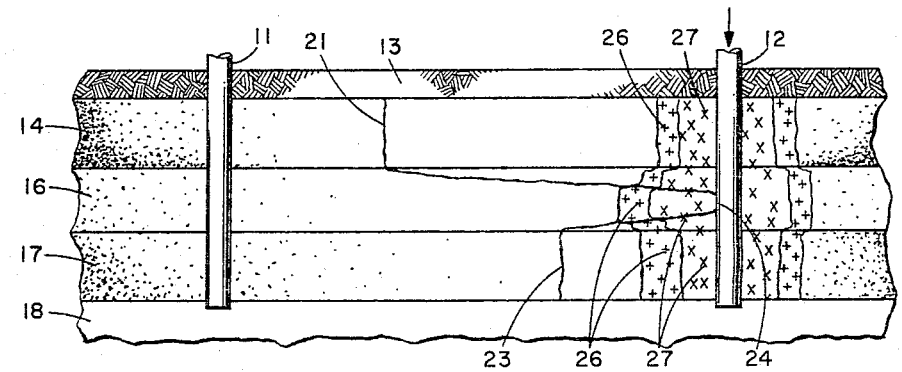
FIGURE 2 shows the reservoir of FIGURE 1 after the initial steps of the present invention have been practiced.
Figure 3:
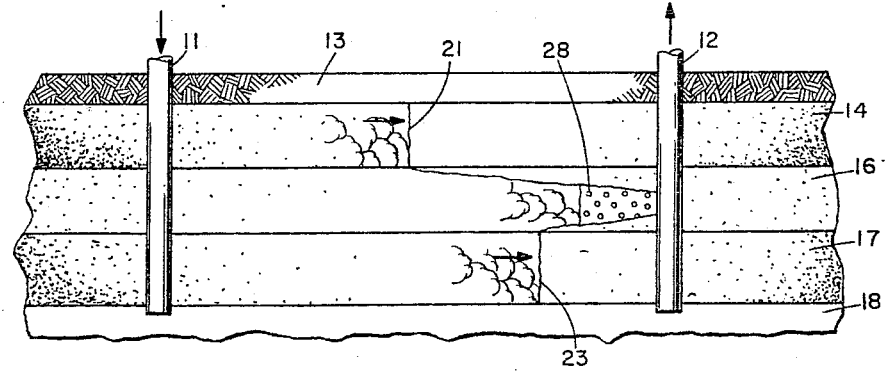
FIGURE 3 shows the reservoir of FIGURE 2 upon completion of all the steps of the present method to restore or increase the efficiency in utilizing a driving fluid for producing oil from the reservoir.

Referring now to the drawings, a preferred illustrative embodiment of the present invention will be described. In FIGURES 1, 2, and 3 there are shown an injection well 11 and a production well 12 penetrating the earth. These wells 11 and 12 may be provided with the usual apparatus for injecting and producing fluids, respectively. The wells 11 and 12 pass through an overburden 13, an oil reservoir comprised of a strata 14 of low permeability, a strata 16 of high permeability, and a strata 17 of medium permeability. The wells 11 and 12 terminate in a substrata 18 which may be bedrock. The terms "low," "medium," and "high" are used in a comparative sense and not in regard to any specific permeability or ranges of permeability.

More particularly, by high permeability of the strata 16, as the term is used herein, is meant a permeability having such characteristics that the oil and driving fluid will traverse the strata 16 at a rate sufficiently higher than in the strata 14 and 17 to produce (1) a permature breakthrough at the strata 16 of the driving fluid into the well 12, and (2) an unacceptable decline in the efficiency of the recovery of oil by the driving fluid after breakthrough as a result of the increasing amounts of driving fluid that must be introduced into well 11 for each unit volume of oil produced into well 12. Thus, the term "high," when used in reference to permeability, cannot be defined as a specific permeability or permeability ratio between the strata 16 and the strata 14 and 17, since other factors must be considered.

In this embodiment, the oil recovery from the reservoir is by utilization of a carbon dioxide slug driven by a suitable medium in a miscible, or partially miscible, displacement procedure. More particularly, a slug of carbon dioxide is introduced into the strata 14, 16, and 17 via the well 11. Preferably, the amount of carbon dioxide injected into the oil reservoir is sufficient to provide a more or less discrete body of carbon dioxide in contact with the oil across the reservoir. The volume of the slug is readily determinable by persons skilled in the art when consideration is given to the properties of the oil reservoir, the driving fluids, oil viscosity, etc. For example, in some instances the slug of carbon dioxide may have a volume of about 20 percent of the hydrocarbon pore volume of the reservoir from which oil is to be produced by the procedure.

The carbon dioxide slug may be driven through the oil reservoir by using any suitable fluid. Examples of suitable fluids are natural gas, flue gas, enriched gas, and water. Natural gas will be used as the driving medium for the carbon dioxide slug in the present illustrative embodiment. The injection of the carbon dioxide slug, and the natural gas, to drive the same, is usually applied with sufficient pressure to maintain miscibility between the carbon dioxide slug and the oil in the reservoir. However, the pressure should not exceed the overburden breakdown pressure, otherwise fracturing may occur to irreparably injure the oil reservoir. Thus, for purposes of this invention, the slug of carbon dioxide and the following natural gas to drive the slug through the reservoir can be termed a driving fluid containing carbon dioxide. Alternatively, the carbon dioxide can be intermixed with the natural gas and still be termed a driving fluid containing carbon dioxide. Obviously, in certain procedures the carbon dioxide may be the driving fluid with little or no natural gas or other material present.

The driving fluid containing carbon dioxide injected into the strata 14, 16, and 17 displaces the oil to the well 12 from which it can be produced by any suitable means as will be apparent to those skilled in the art. The driving fluid-oil contact interfaces or fronts in the strata 14, 16, and 17 are designated by the numerals 21, 22, and 23, respectively. Eventually, as seen in FIGURE 1, the driving fluid front 22 prematurely breaks through into the well 12 as a result of the high permeability of the strata 16. This results in the driving fluid channeling through the strata 16 at breakthrough which undesirably reduces the efficiency of the driving fluid in the production of oil.

The breakthrough of the driving fluid at the strata 16 into well 12 is through a small area 24, as shown in FIGURE 2. However, large volumes of driving fluid, especially gases, can channel through such area 24. Also, the fluids entering the well 12 from the strata 14, 16 (other than the area 24), and 17 have a different composition from the fluids channeling through the area 24. Thus, oil enters the well 12 from all the strata 14, 16, and 17 in the reservoir except for the area 24 in the strata 16 where the driving fluid has broken through. The driving fluid containing carbon dioxide enters the well 12 only through the area 24 in the strata 16.

When the efficiency of the production of oil decreases to an unacceptable amount, or for other reasons, the method of this invention may be practiced. The injection of the driving fluid into the well 11 need not be terminated. However, under certain conditions, as when using a waterflood, the driving fluid injection may be terminated to prevent driving fluid build up in the reservoir, or for other reasons. It is usually desirable to close the well 12 to the flow of formation fluids to preserve the pressure of the fluids in the oil reservoir.

As a step of this invention, there is introduced into the oil reservoir comprising the strata 14, 16, and 17 adjacent the well 12, a substance convertible to a formation pore plugging material upon reaction with the carbon dioxide in the driving fluid. By plugging material, as the term is used herein, it is meant a mass, either solid, gel, or highly viscous, that when disposed in the strata 16 will decrease the flow of fluids through such formation. The plugging material need not prevent all fluid flows, but merely sufficiently to reduce the channeling of the driving fluids in the strata 16 to an acceptable rate. Such rate may be about the rate of the oil being produced into the well 12. Thus, the radial penetration of the substance convertible into a plugging material or its effects on fluid flows may be adjusted to obtain a desired reduction in fluid flow through the strata 16 adjacent to the well 12. Preferably, the substance is not miscibly displaced in the reservoir by the driving fluid.

The substance convertible to a plugging material upon reaction with the carbon dioxide in the driving fluid preferably is sodium silicate. Usually, the sodium silicate is used in an alkaline solution. Various concentrations of sodium silicate solutions may be used, such as those available commercially. The solutions having concentrations of sodium silicate of about 15 percent by weight are viscous. Thus, a high pressure for their injection into the strata 16 is required. However, the amount of plugging material such solutions produce is proportionally large as is the relative restriction of fluid flow obtained. The solutions of sodium silicate of about 1 percent by weight are more like water in viscosity. However, greater radial penetration of the strata 16 from the well 12 is required to produce a given restriction to fluid flow than with the more concentrated solutions. It will be apparent that any concentration of sodium silicate solution may be used, and that the particular circumstances of the oil reservoir will usually indicate which solution concentration is easier to apply, and to what radial penetration, in accordance with this invention.

Temporarily interrupting the description of the step of injecting the sodium silicate solution, a nonessential but useful intermediate step may be desired. In such step, a buffer fluid 26 inert with respect to the driving fluid, the carbon dioxide, the oil, and the sodium silicate solution may be introduced into the strata 14, 16, and 17 from the well 12 immediately prior to the introduction of the sodium silicate solution. The buffer fluid 26 should be more miscible with the driving fluid than with the sodium silicate solution, or the formation fluids, for optimum results. The buffer fluid 26 preferably is natural gas or air where carbon dioxide is a miscible slug driven by natural gas. Other suitable miscible fluids for various driving fluids are known in the related arts. The buffer fluid 26, for example, natural gas, because of its excellent miscibility with the driving fluid and carbon dioxide, is best used in an amount sufficient to form a discrete slug as shown in FIGURE 2. The buffer fluid 26 is of advantage in preventing premature reaction of the sodium silicate with the injected carbon dioxide in the strata 16.

After the injection of the buffer fluid 26, if used, the sodium silicate solution 27 is introduced through the well 12 into the adjacent strata 14, 16, and 17. The sodium silicate solution may be, for example, a 3 percent by weight aqueous sodium silicate solution. As can be seen in FIGURE 2, the sodium silicate solution 27 penetrates the strata 14 and 17 to only a small extent. However, the sodium silicate solution 27 readily penetrates that part of the strata 16 traversed by the driving fluid exiting through the area 24 into the well 12 to a much greater extent. It is noted that the remainder of strata 16 is penetrated to a lesser extent. Thus, the amount of sodium silicate solution 27 introduced into the strata 14, 16 (except that part traversed by driving fluid), and 17 is less than the amount introduced through the area 24 into the strata 16 traversed by the driving fluid. Thus, for practical purposes, the amount of sodium silicate solution introduced via well 12 need be only slightly more than desired to be radially displaced into that portion of the strata 16 containing the driving fluid from the area 24.

The introduction of the driving fluid into the well 11 may now be resumed if its injection was initially terminated. In some instances, as when no further breakthroughs occur, or for other reasons, the driving fluid may be only natural gas. When desired, the carbon dioxide may also be injected into the well 12 along with the natural gas. Both of these compositions of the driving fluid are included in the terminology recited in the step of resuming injection of the driving fluid. As the last step, oil is produced from the well 12. With reference to FIGURE 3, the produced oil which is displaced by the driving fluid through the strata 14 and 17, and that portion of the strata 16 not traversed by the driving fluid, will sweep out the sodium silicate solution 27 and also the buffer fluid 26, if such is present, into the well 12. No reaction between the sodium silicate solution 27 and the injected carbon dioxide in the reservoir can take place because of the intervening oil.

However, the injected carbon dioxide in the reservoir displaced by the driving fluid sweeps through the sodium silicate solution 27 in the strata 16 which has been previously traversed by driving fluid and also the buffer fluid 26, if such is present. Although some of the sodium silicate solution 27 may be swept into the well 12, most of it remains in this portion of the strata 16 especially immediately adjacent the well 12 at the area 24. This result is obtained since the sodium silicate solution 27 is not miscible with the driving fluid or the buffer fluid 26. Also, the injected carbon dioxide reacts on contact with the sodium silicate solution 27 to produce a plugging material 28 in the strata 16 through which the driving fluid has channeled to the well 12 at the area 24. This plugging material 28 restricts the undesired channeling flow of driving fluid from the strata 16 through the area 24 into the well 12. Thus, the oil bypassing of the driving fluid through the strata 16 into the well 12 about the area 24 is alleviated and the oil producing efficiency of the driving fluid-oil producing procedure is restored.

This result of the present invention permits the channeling of the driving fluid to be blocked by placing a plugging material through a small area into a high permeability strata creating the offending flow of the driving fluid. The present method may be repeated at each similar breakthrough of the driving fluid into the well 12. For example, the front 23 in the strata 17 eventually will break through into the well 12 leaving an amount of oil left in the strata 14 to be recovered. Such breakthrough can be remedied by repeating the foregoing steps.

Other nonhydrocarbon material, not reactive with the oil in the reservoir, may be used in the driving fluid, as a slug driven before a driving medium, or as the driving fluid itself, to obtain advantageous results. For example, the driving fluid may contain an acidic material capable of reaction with the sodium silicate solution. These acidic materials may be hydrogen sulfide, strong mineral acids as for example sulfuric acid, salts containing the bicarbonate ion as for example ammonium bicarbonate, and other acid-reaction suitable materials.

Similarly, a solution of substances other than sodium silicate may be used. For example, substances convertible to a plugging material by reaction with water, but not with oil, may be used. In such case, the driving fluid may be water, or include water as an admixture, or used as a driven slug before a suitable driving medium. Examples of the water-convertible materials are titanium tetrachloride, stannic chloride, silicon tetrachloride, and aluminum bromide. Other suitable substances will be apparent to those skilled in the art. Obviously, various materials not reactive with oil, and other than oils or hydrocarbons, may be used in the driving fluid or as the driving fluid and correspondingly reactive substances, not reactive with the oil, can be introduced into the oil reservoir from the production well to obtain the desired results.

From the foregoing, it will be apparent that there has been herein disclosed a method well suited to satisfy all the stated objects and which produces several advantages. Various changes and adaptations may be made to the present method by a person skilled in the art without departing from the intent of the invention. It is intended that the foregoing description be considered as illustrative and the only limitations to be applied are those in the appended claims.

What is claimed is:

1. In the recovery of oil from a reservoir having a high permeability zone by injecting a driving fluid containing a material into a first well to displace oil toward a second well, said material capable of converting a solution of a substance to a plugging material by their reaction within the reservoir, and the method comprising the steps of:
   (a) producing oil from the second well until the driving fluid containing the described material breaks through into the second well at the high permeability zone in the reservoir,
   (b) terminating the injection of fluids into the first well,
   (c) introducing into the reservoir from the second well a solution of a substance convertible to a plugging material upon reaction with the described material in the driving fluid in the reservoir, and
   (d) resuming the steps of introducing the driving fluid containing the described material into the first well and producing oil from the second well.

2. The method of claim 1 wherein a slug of a buffer fluid miscible with the driving fluid and the material in the driving fluid but immiscible with the substance convertible to a plugging material, the driving fluid containing the described material, and the mentioned substance, is introduced into the reservoir from the second well immediately prior to the step of introducing the solution of the substance into the reservoir.

3. The method of claim 1 wherein the steps (b), (c), and (d) are repeated at each breakthrough of the driving fluid containing the described material until substantially all of the recoverable oil from the reservoir is produced.

4. In the recovery of oil from a reservoir having a high permeability zone by injecting a driving fluid containing carbon dioxide into a first well to displace oil toward a second well, the method comprising the steps of:
   (a) producing oil from the second well until the driving fluid containing carbon dioxide breaks through into the second well at the high permeability zone in the reservoir,
   (b) terminating the injection of fluids into the first well,
   (c) introducing into the reservoir from the second well a solution of sodium silicate, and
   (d) resuming the steps of introducing the driving fluid containing carbon dioxide into the first well and producing oil from the second well.

5. The method of claim 4 wherein a slug of a buffer fluid immiscible with the sodium silicate solution, miscible with the driving fluid containing carbon dioxde, and miscible with the oil in the reservoir, is introduced into the reservoir from the second well immediately prior to the step of introducing the solution of sodium silicate into the reservoir.

6. The method of claim 4 wherein the steps (b), (c), and (d) are repeated at each breakthrough of the driving fluid containing carbon dioxide until substantially all of the recoverable oil from the reservoir is produced.

7. In the recovery of oil from a reservoir having a high permeability zone by injecting a driving fluid containing a material for converting a solution of sodium silicate into a plugging material into a first well to displace oil toward a second well, the method comprising the steps of:
   (a) producing oil from the second well until the driving fluid containing a material for converting a solution of sodium silicate into a plugging material breaks through into the second well at the high permeability zone in the reservoir,
   (b) terminating the injection of fluids into the first well,
   (c) introducing into the reservoir from the second well a solution of sodium silicate, and
   (d) resuming the steps of introducing the driving fluid containing the mentioned material into the first well and producing oil from the second well.

8. The method of claim 7 wherein a slug of a buffer fluid immiscible with the sodium silicate solution, miscible with the driving fluid containing the mentioned material, and miscible with the oil in the reservoir, is introduced into the reservoir prior to the step of introducing the sodium silicate solution into the reservoir.

9. The method of claim 7 wherein the steps (b), (c), and (d) are repeated at each breakthrough of the driving fluid containing the mentioned material until substantially all of the recoverable oil in the reservoir is produced.

10. In the recovery of oil from a reservoir having a high permeability zone by injecting a driving fluid containing a material into a first well to displace oil toward a second well, said material capable of converting a solution of a substance to a plugging material by their reaction within the reservoir, and the method comprising the steps of:
   (a) producing oil from the second well until the driving fluid containing the described material breaks through into the second well at the high permeability zone in the reservoir,
   (b) introducing into the reservoir from the second well a solution of a substance convertible to a plugging material upon reaction with the described material in the driving fluid in the reservoir, and
   (c) producing oil from the second well.

11. The method of claim 10 wherein a slug of a buffer fluid miscible with respect to the driving fluid containing the described material, and immiscible with the mentioned substance, is introduced into the reservoir from the second well immediately prior to the step of introducing the solution of the substance into the reservoir.

12. The method of claim 10 wherein the steps (b) and (c) are repeated at each breakthrough of the driving fluid containing the described material until substantially all of the recoverable oil from the reservoir is produced.

13. In the recovery of oil from a reservoir having a high permeability zone by injecting a driving fluid containing carbon dioxide into a first well to displace oil toward a second well, the method comprising the steps of:
   (a) producing oil from the second well until the driving fluid containing carbon dioxide breaks through into the second well at the high permeability zone in the reservoir,
   (b) introducing into the reservoir from the second well a solution of sodium silicate, and
   (c) producing oil from the second well.

14. The method of claim 13 wherein a slug of a buffer fluid immiscible with the sodium silicate solution, miscible with the driving fluid containing carbon dioxide, and miscible with the oil in the reservoir, is introduced into the reservoir from the second well immediately prior to the step of introducing the solution of sodium silicate into the reservoir.

15. The method of claim 13 wherein the steps (b) and (c) are repeated at each breakthrough of the driving fluid containing carbon dioxide until substantially all of the recoverable oil from the reservoir is produced.

16. In the recovery of oil from a reservoir having a high permeability zone by injecting a driving fluid containing a material for converting a solution of sodium silicate into a plugging material into a first well to displace oil toward a second well, the method comprising the steps of:
   (a) producing oil from the second well until the driving fluid containing a material for converting a solution of sodium silicate into a plugging material breaks through into the second well at the high permeability zone in the reservoir,
   (b) introducing into the reservoir from the second well a solution of sodium silicate, and
   (c) producing oil from the second well.

17. The method of claim 16 wherein a slug of a buffer fluid immiscible with the sodium silicate solution, miscible with the driving fluid containing the mentioned materal, and miscible with the oil in the reservoir, is introduced into the reservoir prior to the step of introducing the sodium silicate solution into the reservoir.

18. The method of claim 16 the steps (b) and (c) are repeated at each breakthrough of the driving fluid containing the mentioned material until substantially all of the recoverable oil in the reservoir is produced.

References Cited by the Examiner
UNITED STATES PATENTS

| | | | |
|---|---|---|---|
| 2,786,530 | 3/1957 | Maly | 166—10 |
| 3,127,934 | 4/1964 | Csaszar | 166—9 |
| 3,199,588 | 8/1965 | Holbert | 166—33 |

CHARLES E. O'CONNELL, Primary Examiner.

T. A. ZALENSKI, Assistant Examiner.